United States Patent
Mikami

(10) Patent No.: US 10,688,690 B2
(45) Date of Patent: Jun. 23, 2020

(54) METHOD FOR PRODUCING FIBER-REINFORCED RESIN MOLDED BODY

(71) Applicant: TOYOTA JIDOSHA KABUSHIKI KAISHA, Toyota-shi, Aichi (JP)

(72) Inventor: Masahiro Mikami, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 15/799,818

(22) Filed: Oct. 31, 2017

(65) Prior Publication Data

US 2018/0178414 A1 Jun. 28, 2018

(30) Foreign Application Priority Data

Dec. 28, 2016 (JP) ................. 2016-254857

(51) Int. Cl.
*B29B 13/02* (2006.01)
*B29C 43/34* (2006.01)
(Continued)

(52) U.S. Cl.
CPC .......... *B29B 13/022* (2013.01); *B29B 13/023* (2013.01); *B29B 13/08* (2013.01);
(Continued)

(58) Field of Classification Search
CPC ....... B29B 13/022; B29C 43/34; B29C 43/04; B29C 2043/046; C08J 5/047; B29K 2995/0005; F27D 3/12; F27D 5/0056
See application file for complete search history.

(56) References Cited

U.S. PATENT DOCUMENTS 4,252,513 A * 2/1981 Kalnins ................... B29C 35/02
264/450
4,486,172 A * 12/1984 Dunning ............... B29B 13/023
219/388
(Continued)

FOREIGN PATENT DOCUMENTS

DE 103 51 178 A1 6/2005
DE 10 2011 012 654 A1 8/2012
(Continued)

*Primary Examiner* — Alison L Hindenlang
*Assistant Examiner* — Olukorede Esan
(74) *Attorney, Agent, or Firm* — Oliff PLC

(57) ABSTRACT

A method for producing a fiber-reinforced resin molded body, including heating a fiber-reinforced resin molded body precursor containing thermoplastic resin as matrix resin to soften it and molding it in a molding die, where temperature unevenness between the inside and surface of the fiber-reinforced resin molded body precursor can be reduced. The method includes a first step of storing a fiber-reinforced resin molded body precursor containing thermoplastic resin as the matrix resin and containing conductive fibrous materials therein into a heating furnace with heating apparatuses while holding the precursor using a pair of holding tools, which also function as electrodes, and then actuating the heating apparatuses while supplying current to the precursor from the electrodes, thereby softening the precursor; and a second step of transferring the softened precursor to a molding die using the holding tools, and molding a fiber-reinforced resin molded body in the molding die.

8 Claims, 4 Drawing Sheets

(51) Int. Cl.
*B29C 43/04* (2006.01)
*C08J 5/04* (2006.01)
*B29C 43/52* (2006.01)
*F27D 3/12* (2006.01)
*F27D 5/00* (2006.01)
*B29K 105/12* (2006.01)
*B29K 105/08* (2006.01)
*B29C 35/02* (2006.01)
*B29B 13/08* (2006.01)

(52) U.S. Cl.
CPC .......... *B29C 35/02* (2013.01); *B29C 35/0272* (2013.01); *B29C 43/04* (2013.01); *B29C 43/34* (2013.01); *B29C 43/52* (2013.01); *C08J 5/047* (2013.01); *F27D 3/12* (2013.01); *F27D 5/0056* (2013.01); *B29C 2035/0211* (2013.01); *B29C 2043/046* (2013.01); *B29C 2043/3405* (2013.01); *B29C 2043/3411* (2013.01); *B29C 2043/3422* (2013.01); *B29K 2105/08* (2013.01); *B29K 2105/12* (2013.01); *B29K 2995/0005* (2013.01)

(56) References Cited

U.S. PATENT DOCUMENTS

| | | | |
|---|---|---|---|
| 5,283,026 A * | 2/1994 | Okumura | B29B 13/02 264/234 |
| 2003/0173715 A1 | 9/2003 | Grutta et al. | |
| 2006/0118238 A1* | 6/2006 | Borazghi | B29C 43/30 156/309.6 |
| 2013/0056900 A1 | 3/2013 | Muller | |
| 2013/0175740 A1* | 7/2013 | Shinoda | B29C 43/3642 264/571 |
| 2016/0029437 A1* | 1/2016 | Grohmann | B29C 31/08 219/486 |
| 2017/0217127 A1* | 8/2017 | Kobayashi | B32B 5/24 |
| 2017/0259465 A1* | 9/2017 | Klauke | B29C 35/0272 |

FOREIGN PATENT DOCUMENTS

| | | | |
|---|---|---|---|
| JP | 59002815 A | * | 1/1984 |
| JP | S59-2815 A | | 1/1984 |
| JP | H01-115935 A | | 5/1989 |
| JP | 2014-124834 A | | 7/2014 |
| JP | 2016-083845 A | | 5/2016 |

\* cited by examiner

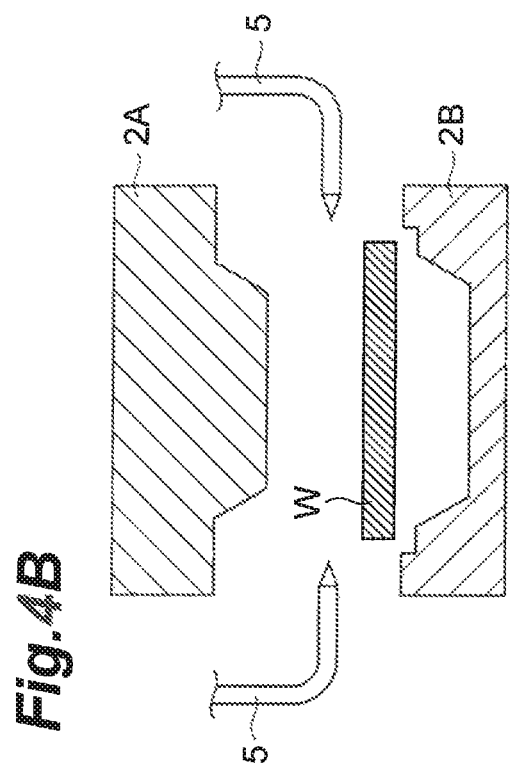
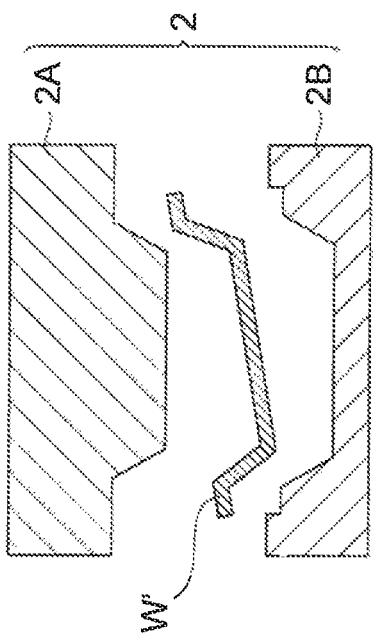
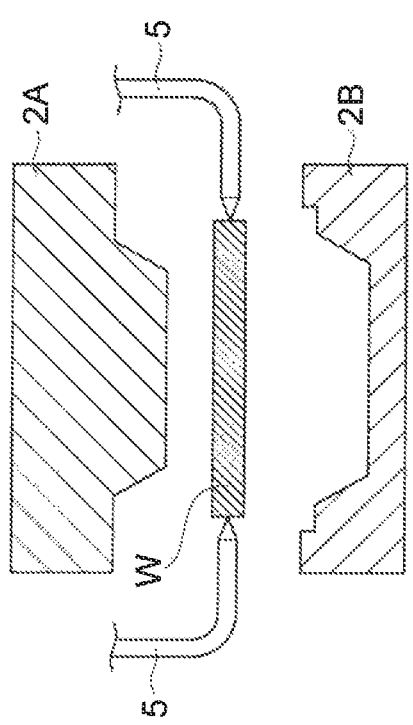
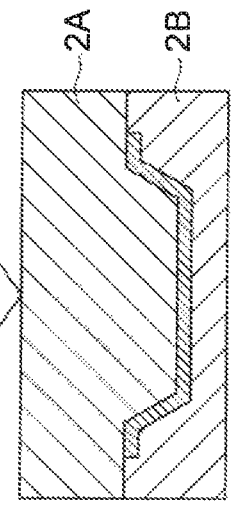

METHOD FOR PRODUCING FIBER-REINFORCED RESIN MOLDED BODY

CROSS REFERENCE TO RELATED APPLICATIONS

The present application claims priority from Japanese patent application JP 2016-254857 filed on Dec. 28, 2016, the content of which is hereby incorporated by reference into this application.

BACKGROUND

Technical Field

The present disclosure relates to a method for producing a fiber-reinforced resin molded body.

Background Art

There are a variety of methods for producing a fiber-reinforced resin molded body (FRP) containing thermoplastic resin as matrix resin. One of such molding methods is a production method that includes sufficiently heating a molding material (e.g., thermoplastic resin sheet), which contains matrix resin and also contains a reinforcing fibrous material in the matrix resin, immediately before molding it into a desired three-dimensional shape and thus softening it, and then press-molding it, as described in JP 2014-124834 A.

In such a production method, an automatic transfer tray is often used to transfer the thermoplastic resin sheet to a heating furnace and take the thermoplastic resin sheet, which has softened in the heating furnace, out of the heating furnace, taking into consideration the production cycle time from the perspective of mass-producing molded bodies. More specifically, a thermoplastic resin sheet is placed on a transfer tray, which has a plurality of rollers attached thereto with distances therebetween, and is transferred to a heating furnace, and then the transfer tray having placed thereon the thermoplastic resin sheet, which has softened, is taken out of the heating furnace.

As described above, when a transfer tray having a thermoplastic resin sheet placed thereon is transferred to and taken out of a heating furnace, indentations of the rollers of the transfer tray may be left on the thermoplastic resin sheet, which can degrade the mechanical properties of the thermoplastic resin sheet and cause failures in the appearance. Herein, JP 2016-083845 A discloses a heating method that includes placing a thermoplastic resin sheet on a transfer tray, which has a plurality of rollers attached thereto with distances therebetween, transferring the transfer tray having the thermoplastic resin sheet placed thereon to a heating furnace, heating the thermoplastic resin sheet in the heating furnace using heat supplied from at least below the transfer tray, and taking the transfer tray out of the heating furnace, where the rollers of the transfer tray are pre-heated before the thermoplastic resin sheet is heated in the heating furnace.

SUMMARY

According to the method for heating a thermoplastic resin sheet disclosed in JP 2016-083845 A, it is possible to supply sufficient heat to a portion of the thermoplastic resin sheet in which supply of heat is disturbed by the rollers in the heating furnace. Therefore, indentations of the rollers left on the thermoplastic resin sheet can be suppressed.

When a fiber-reinforced resin molded body precursor such as a thermoplastic resin sheet is heated in a heating furnace, the surface of the fiber-reinforced resin molded body precursor that is directly heated by a heating apparatus such as a heater in the heating furnace is rapidly heated, whereas the inside of the fiber-reinforced resin molded body precursor that is not directly heated by the heating apparatus is difficult to be heated. Therefore, temperature unevenness is likely to occur between the inside and the surface of the fiber-reinforced resin molded body precursor.

When temperature unevenness occurs as described above, it takes a long time to sufficiently heat the inside of the fiber-reinforced resin molded body precursor. Further, during such a long heating time, there arises another problem that the surface of the fiber-reinforced resin molded body precursor, which has been sufficiently heated, is heated too much, and therefore, a desired softened state cannot be obtained. That is, when the inside of the fiber-reinforced resin molded body precursor reaches a desired softened state, the surface has become too soft.

The present disclosure has been made in view of the foregoing problems, and exemplary embodiments relate to providing a method for producing a fiber-reinforced resin molded body, including heating a fiber-reinforced resin molded body precursor containing thermoplastic resin as matrix resin and softening it, and molding it in a molding die, where temperature unevenness between the inside and the surface of the fiber-reinforced resin molded body precursor can be reduced as much as possible.

Accordingly, the method for producing a fiber-reinforced resin molded body in accordance with the present disclosure includes a first step of storing a fiber-reinforced resin molded body precursor containing thermoplastic resin as matrix resin and also containing a conductive fibrous material in the matrix resin into a heating furnace with heating apparatuses while holding the fiber-reinforced resin molded body precursor using a pair of holding tools that also function as electrodes, and actuating the heating apparatuses while supplying current to the fiber-reinforced resin molded body precursor from the electrodes, thereby softening the fiber-reinforced resin molded body precursor; and a second step of transferring the softened fiber-reinforced resin molded body precursor to a molding die using the holding tools, and molding a fiber-reinforced resin molded body in the molding die.

According to the method for producing a fiber-reinforced resin molded body of the present disclosure, a fiber-reinforced resin molded body precursor is heated by the heating apparatuses of the heating furnace, and in addition, the fiber-reinforced resin molded body precursor is held by a pair of holding tools, which also function as electrodes, so that current is supplied to the fiber-reinforced resin molded body precursor from the electrodes, whereby the inside of the fiber-reinforced resin molded body precursor is heated as, when current is supplied to the conductive fibrous material, the fibrous material generates heat due to the electrical resistance thereof, and the surface of the fiber-reinforced resin molded body precursor is heated by the heating apparatuses of the heating furnace, whereby the inside and the surface of the fiber-reinforced resin molded body precursor can be heated concurrently.

As described above, when the inside and the surface of a fiber-reinforced resin molded body precursor are heated concurrently, the heating time for the fiber-reinforced resin molded body precursor can be reduced as much as possible, and further, temperature unevenness between the inside and the surface of the fiber-reinforced resin molded body precursor can be reduced as much as possible.

The "fiber-reinforced resin molded body precursor" as referred to herein means a thermoplastic resin sheet, a thermoplastic resin plate material, or the like before being molded into a fiber-reinforced resin molded body in a molding die, and is a member that contains thermoplastic resin as matrix resin and also contains a conductive fibrous material in the matrix resin.

As the conductive fibrous material, it is possible to apply conductive long fibers, short fibers, continuous fibers, and the like, such as carbon fibers or metal fibers, for example. However, long fibers are preferably used to implement moderate entanglement of the fibrous materials within the matrix resin. When the fibrous materials are moderately entangled within the matrix resin and current is flowed through the fibrous materials that are entangled within the matrix resin, the inside of the fiber-reinforced resin molded body precursor is uniformly heated.

When the fibrous materials are moderately entangled within the matrix resin, it becomes possible to, even after the fiber-reinforced resin molded body precursor has softened in the first step, retain the shape of the softened fiber-reinforced resin molded body precursor and continue holding of the precursor with the holding tools.

The "pair of holding tools that also function as electrodes" can move along rails that are provided on the ceiling, for example. When the pair of holding tools, which are holding the fiber-reinforced resin molded body precursor, arrive at the heating furnace, the front door of the heating furnace opens, and the pair of holding tools move along the rails while passing through two grooves that are provided on the ceiling surface of the heating furnace, and then, the pair of holding tools stop at predetermined positions of the heating furnace, so that the surface and the inside of the fiber-reinforced resin molded body precursor are concurrently heated by the heating apparatuses and by current supplied from the electrodes.

When the fiber-reinforced resin molded body precursor has softened to a desired level, the rear door of the heating furnace opens so that the fiber-reinforced resin molded body precursor is extracted from the heating furnace while the pair of holding tools are moved along the rails.

The molding die is located at the end point of the rails, for example, and the pair of holding tools move along the rails to transfer the fiber-reinforced resin molded body precursor to the molding die, so that the fiber-reinforced resin molded body precursor can be stored in the molding die.

In addition to the aforementioned configuration in which the pair of holding tools move along the rails on the ceiling, it is also possible to use a configuration in which the pair of holding tools are attached to a robot arm, and the robot arm is driven to move the pair of holding tools into the heating furnace and to the molding die, for example.

The softened fiber-reinforced resin molded body precursor is moved to a cavity in the molding die, and is subjected to hot forming or the like, so that a fiber-reinforced resin molded body with a desired shape is produced.

In a preferable embodiment of the method for producing a fiber-reinforced resin molded body in accordance with the present disclosure, supply of current to the fiber-reinforced resin molded body precursor from the electrodes is continued even while the fiber-reinforced resin molded body precursor is transferred to the molding die using the holding tools in the second step.

Even while the fiber-reinforced resin molded body precursor is transferred to the molding die from the heating furnace, heating of the fiber-reinforced resin molded body precursor by the supply of current thereto is continued, so that the temperature of the softened fiber-reinforced resin molded body precursor can be maintained.

Further, according to another embodiment of the method for producing a fiber-reinforced resin molded body in accordance with the present disclosure, the heating apparatuses are located at least in the upper position and the lower position in the heating furnace, and in the first step, the fiber-reinforced resin molded body precursor is placed between the upper and lower heating apparatuses and is heated.

Herein, the phrase "at least in the upper position and the lower position" encompasses not only a configuration in which the heating apparatuses are located in the upper position and the lower position, but also a configuration in which another heating apparatus is provided on each side surface of the heating furnace. When the fiber-reinforced resin molded body precursor is placed between the upper and lower heating apparatuses in the heating furnace and is heated, the entire surface of the fiber-reinforced resin molded body precursor can be uniformly heated as much as possible.

In particular, when the fiber-reinforced resin molded body precursor has a flat sheet shape or a flat plate shape, the heating apparatuses in the upper and lower positions are arranged in parallel with each other in the heating furnace, and in the first step, the fiber-reinforced resin molded body precursor is placed in parallel with the upper and lower heating apparatuses and is heated, whereby the entire surface of the fiber-reinforced resin molded body precursor can be heated even more uniformly. It should be noted that the terra "sheet shape" means a flat member with a relatively small thickness (for example, a thickness of less than or equal to 10 mm), and the "plate shape" means a flat member with a relatively greater thickness than that of a sheet-shaped member (for example, a thickness of greater than 10 mm).

As can be understood from the foregoing description, according to the method for producing a fiber-reinforced resin molded body of the present disclosure, a fiber-reinforced resin molded body precursor is heated by the heating apparatus of the heating furnace, and in addition, the fiber-reinforced resin molded body precursor is held by the pair of holding tools, which also function as electrodes, so that current is supplied to the fiber-reinforced resin molded body precursor from the electrodes, whereby the inside and the surface of the fiber-reinforced resin molded body precursor can be heated concurrently. Therefore, the heating time for the fiber-reinforced resin molded body precursor can be shortened as much as possible, and temperature unevenness between the inside and the surface of the fiber-reinforced resin molded body precursor can be reduced as much as possible.

BRIEF DESCRIPTION OF THE DRAWINGS

FIGS. 4A to 4D are schematic diagrams illustrating the second step of the production method, in order of 4A, 4B, 4C, and 4D, following FIG. 3.

DETAILED DESCRIPTION

Hereinafter, embodiments of a method for producing a fiber-reinforced resin molded body of the present disclosure will be described with reference to the drawings. Although the drawings illustrate a configuration in which a pair of holding tools move along rails that are provided on the ceiling, it is also possible to employ other configurations, such as a configuration in which a pair of holding tools are moved using a robot hand, for example.

(Embodiment of Method for Producing Fiber-Reinforced Resin Molded Body)

Figure 1:
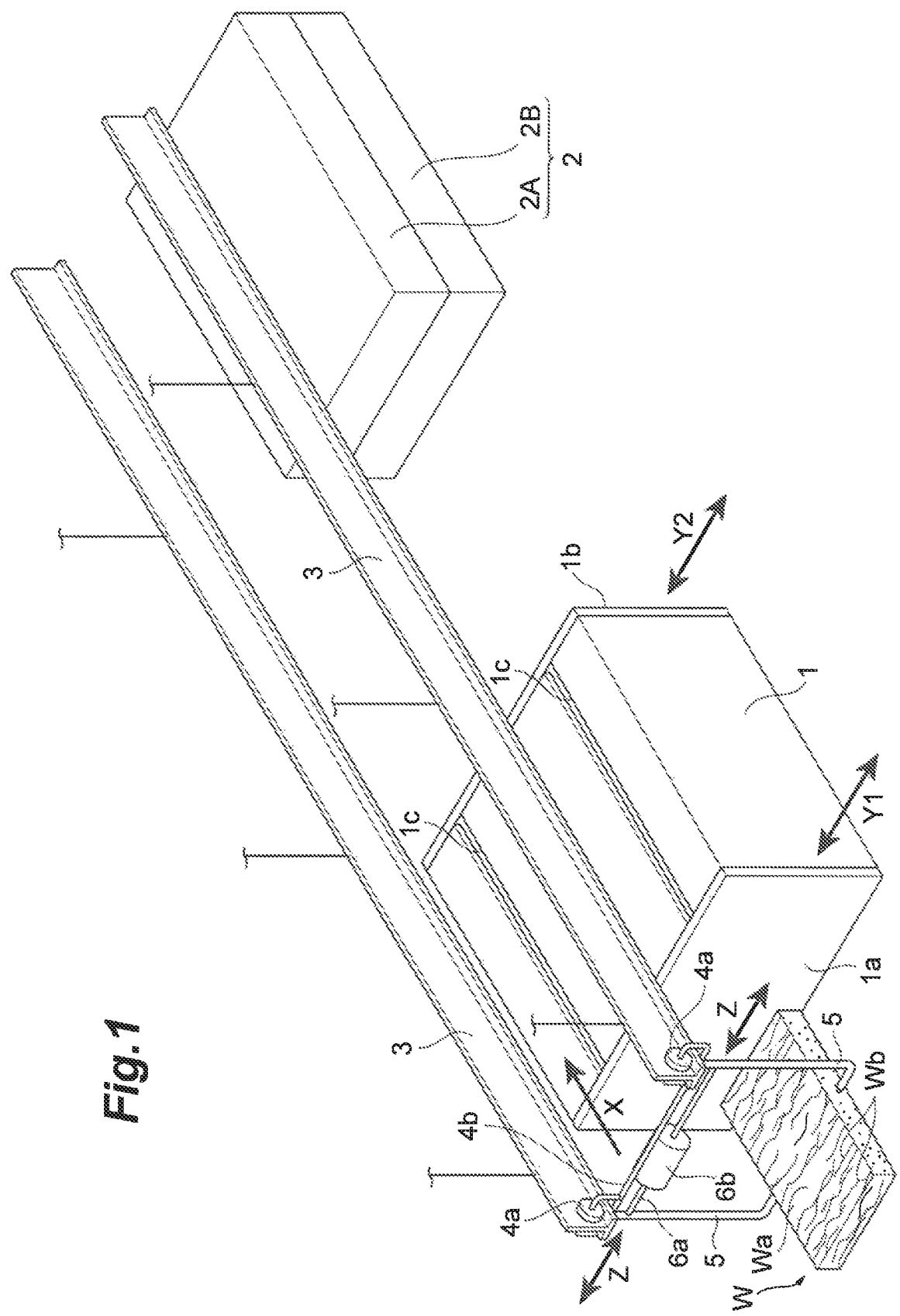
FIG. 1 is a schematic diagram illustrating a first step of the method for producing a fiber-reinforced resin molded body of the present disclosure.
Figure 2:
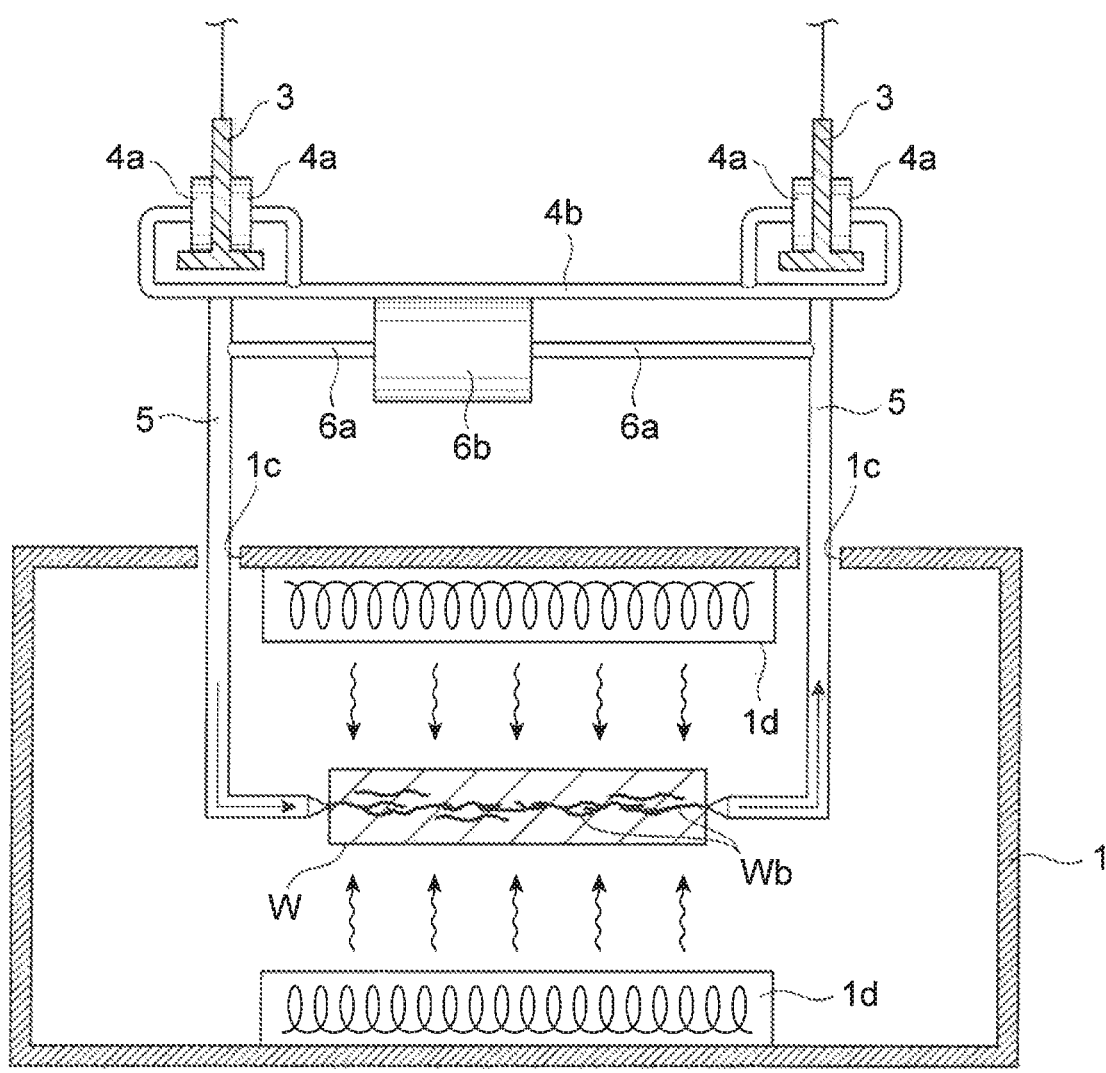
FIG. 2 is a schematic diagram illustrating the first step of the production method following FIG. 1.
Figure 3:
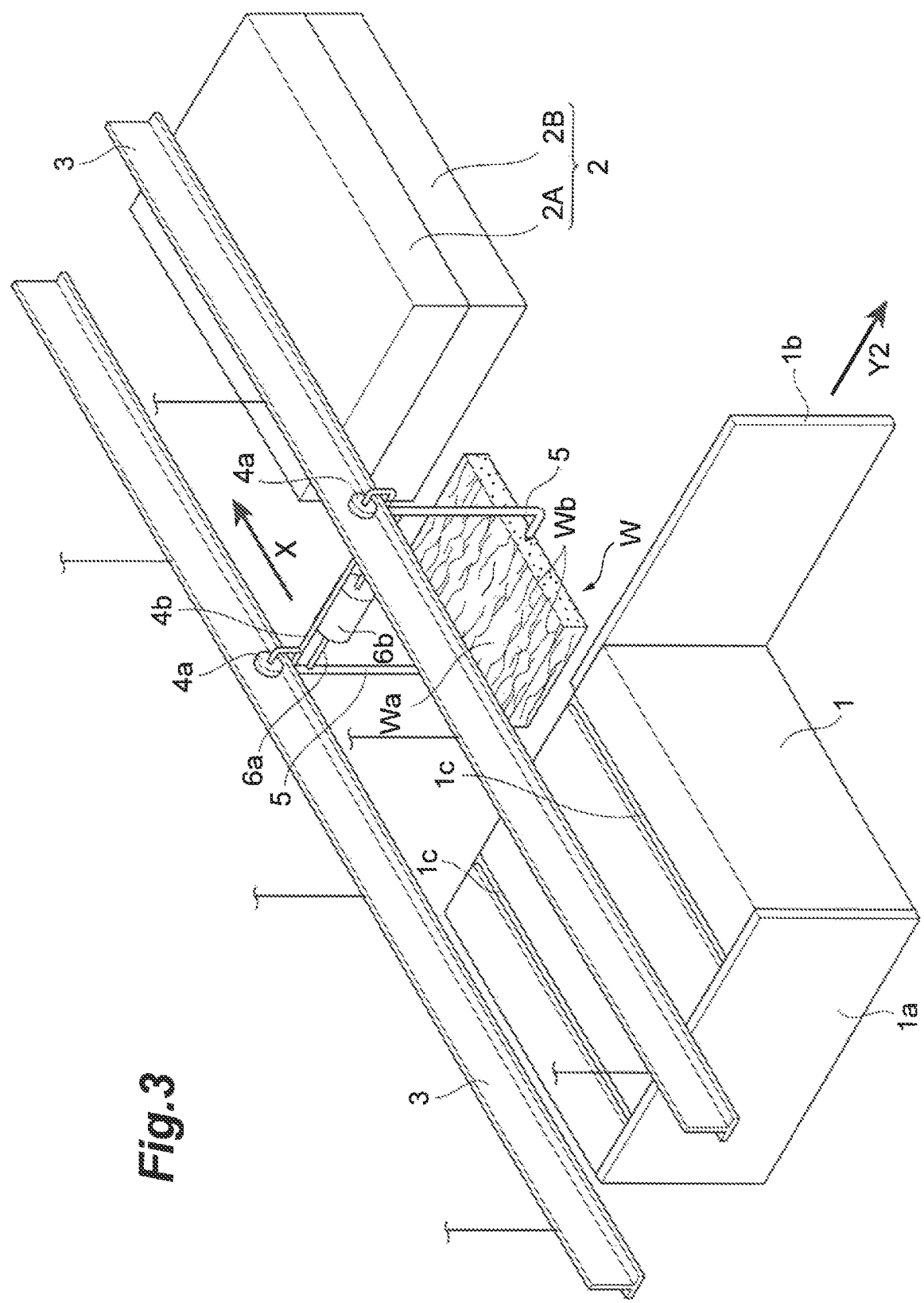
FIG. 3 is a schematic diagram illustrating a second step of the method for producing a fiber-reinforced resin molded body of the present disclosure.

FIGS. 1 and 2 are schematic diagrams sequentially illustrating a first step of the method for producing a fiber-reinforced resin molded body of the present disclosure. FIG. 3 is a schematic diagram illustrating a second step of the method for producing a fiber-reinforced resin molded body of the present disclosure. FIGS. 4A to 4D are schematic diagrams illustrating the second step of the production step, in order of 4A, 4B, 4C, and 4D, following FIG. 3.

The production method illustrated in the drawings is a method for producing a fiber-reinforced resin molded body W' (see FIG. 417) by (pre-) heating a fiber-reinforced resin molded body precursor W, which contains thermoplastic resin as matrix resin Wa and also contains conductive fibrous materials Wb in the matrix resin, in a heating furnace 1 and then molding the precursor W in a molding die 2.

The ceiling above a region of from the heating furnace 1 to the molding die 2, which is located at a position away from the heating furnace, is provided with double suspension rails 3.

Each suspension rail 3 is hung while exhibiting an inverted T-shaped cross-section. A pair of rollers 4a are adapted to move on the right and left flanges of the suspension rail 3.

A pair of rollers 4a are rotatably attached to the right and left ends of a frame 4b that extends along the width direction of the double suspension rails 3.

The rollers 4a each have a built-in servomotor for driving (not illustrated), and the servomotor has a built-in receiving unit that receives a drive ON/OFF command signal sent from an administrator. When the servomotor receives a drive ON command signal, the rollers 4a are rotationally driven, and when the servomotor receives a drive OFF command signal, the rotation drive of the rollers 4a is stopped.

A pair of approximately L-shaped holding tools 5 are attached to the right and left ends of the frame 4b in such a posture that the tip ends of the L-shapes face each other.

More specifically, each holding tool 5 is slidably attached to the frame 4b via a slide mechanism (not illustrated) in the horizontal direction (Z direction), and both the holding tools 5 are adapted to, when holding the illustrated fiber-reinforced resin molded body precursor W, slide and hold the right and left ends of the fiber-reinforced resin molded body precursor W.

The two holding tools 5 also function as a pair of electrodes. Conductive wires for a circuit 6a are connected to the upper ends of the respective holding tools 5, and a power supply 6b is provided in the circuit. It should be noted that an ON/OFF switch (not illustrated) is provided in the circuit 6a, and the circuit is controlled to be turned ON when the switch receives an ON command signal from an administrator, so that the two holding tools 5, which are a pair of electrodes, can flow current.

Herein, as the fiber-reinforced resin molded body precursor W contains the conductive fibrous materials Wb, current supplied to the holding tools 5, which are a pair of electrodes, can be flowed through the inside of the fiber-reinforced resin molded body precursor W via the conductive fibrous materials Wb.

Herein, the fiber-reinforced resin molded body precursor W contains thermoplastic resin as the matrix resin Wa and also contains the conductive fibrous materials Wb in the matrix resin Wa, and has a surface with a flat sheet shape.

Examples of the material of the matrix resin that forms the fiber-reinforced resin molded body precursor W include one selected from the group consisting of crystalline plastic, such as polyethylene (PE), polypropylene (PP), polyamide (PA such as nylon 6 or nylon 66), polyacetal (POM), or polyethylene terephthalate (PET); amorphous plastic, such as polystyrene (PS), polyvinyl chloride (PVC), polymethyl methacrylate (PMMA), ABS resin, or thermoplastic epoxy; and the like; or a mixture of two or more of them.

Meanwhile, examples of the fibrous materials Wb include a mixed material of one or more of conductive materials selected from the group consisting of inorganic fibers, such as carbon fibers; metal fibers of copper, steel, aluminum, or stainless steel; and the like. Herein, although long fibers, short fibers, continuous fibers, and the like can be used as the fibrous materials Wb, long fibers are preferably used to implement moderate entanglement of the fibrous materials Wb within the matrix resin Wa. When the fibrous materials Wb are moderately entangled within the matrix resin Wa and current is flowed through the fibrous materials Wb that are entangled within the matrix resin Wa, the inside of the fiber-reinforced resin molded body precursor W is uniformly heated.

As illustrated in FIG. 1, the fiber-reinforced resin molded body precursor W is held by the pair of holding tools 5, which also function as electrodes, and the rollers 4a are moved along the rails 3, whereby the fiber-reinforced resin molded body precursor W is transferred to the heating furnace 1.

The heating furnace 1 includes a front door 1a that can be slidably opened and closed (in the Y1 direction) and a rear door 1b that can be slidably opened and closed (in the Y2 direction), and further includes on the ceiling two grooves 1c through which the two holding tools 5 can pass.

The front door 1a of the heating furnace 1 opens, and the pair of holding tools 5 enter the heating furnace 1 while passing through the grooves 1c along with the movement of the rollers 4a, so that the fiber-reinforced resin molded body precursor W is transferred into the heating furnace 1 and then, the front door 1a closes.

As illustrated in FIG. 2, in the heating furnace 1, heating apparatuses 1d, each having an area of greater than or equal to the area of the fiber-reinforced resin molded body precursor W, are arranged in parallel in the upper position and the lower position in the heating furnace 1, and the fiber-reinforced resin molded body precursor W held by the pair of holding tools 5 is also positioned in parallel with the upper and lower heating apparatuses 1d. Examples of the heating apparatuses 1d include IR heaters and hot air generators. In addition, another heating apparatus may also be attached to the inner side surface of the heating furnace 1, though not illustrated in the drawing, but in order to heat the surface of the sheet-shaped fiber-reinforced resin molded body precursor W as in the example illustrated herein, heating by the upper and lower heating apparatuses 1d would be sufficient.

In the heating furnace 1, at the same time as the actuation of the heating apparatuses 1d to heat the surface of the fiber-reinforced resin molded body precursor W, current is flowed between the pair of holding tools 5 that hold the fiber-reinforced resin molded body precursor W and that also function as electrodes. Accordingly, current is flowed through the conductive fibrous materials Wb in the fiber-reinforced resin molded body precursor W, and the fibrous materials Wb thus generate heat on the basis of the electric resistance thereof, so that the inside of the fiber-reinforced resin molded body precursor W is heated by the heat generated, and thus, the surface and the inside of the fiber-reinforced resin molded body precursor W are heated concurrently.

Herein, in the heating furnace 1, the fiber-reinforced resin molded body precursor W that is held in a posture parallel with the mutually parallel upper and lower heating apparatuses 1d is heated. Therefore, the entire surface of the fiber-reinforced resin molded body precursor W is uniformly heated, and heating is thus performed without temperature unevenness of the entire surface.

Meanwhile, since the inside of the fiber-reinforced resin molded body precursor W is also heated with current flowed therethrough, temperature unevenness between the surface and the inside in the heated state is reduced as much as possible. It is preferable to determine in advance the heating conditions of the heating apparatuses 1d as well as the conditions of flowing current from the power supply 6b under which a state free from temperature unevenness between the surface and the inside of the fiber-reinforced resin molded body precursor W can be created, and execute heating and flow current under such preferable conditions.

As described above, a fiber-reinforced resin molded body precursor W, which contains thermoplastic resin as the matrix resin Wa and also contains conductive fibrous materials Wb in the matrix resin Wa, is stored in the heating furnace 1 with the heating apparatuses 1d in a state in which the fiber-reinforced resin molded body precursor W is held by the pair of holding tools 5, which also function as electrodes, and then, the heating apparatuses 1d are actuated while current is supplied to the fiber-reinforced resin molded body precursor W from the electrodes, so that the fiber-reinforced resin molded body precursor W is softened concurrently from the surface and the inside thereof (hereinabove is the first step).

When the fiber-reinforced resin molded body precursor W has softened to a desired level, heating by the heating apparatuses 1d is stopped, and the rear door 1b of the heating furnace 1 is opened (in the Y2 direction) as illustrated in FIG. 3, and then, the rollers 4a are driven to transfer the softened fiber-reinforced resin molded body precursor W, which is held by the holding tools 5, to the outside of the heating furnace 1.

The molding die 2 is arranged ahead along the suspension rails 3. The fiber-reinforced resin molded body precursor W is transferred to the molding die 2 while being held by the pair of holding tools 5. In the production method illustrated in the drawing, supply of current to the softened fiber-reinforced resin molded body precursor W from the power supply 6b is continued even in the transfer process.

As described above, supply of current to the fiber-reinforced resin molded body precursor W from the pair of holding tools 5 in the heating furnace 1 is continued even in the transfer process from the heating furnace 1 to the molding die 2, whereby it becomes possible to effectively solve the problem that the fiber-reinforced resin molded body precursor W that has softened to a desired level may have a temperature decrease during the transfer process or may not have the desired softened state maintained when transferred into the molding die 2.

It should be noted that when the transfer time is extremely short and the softened state of the fiber-reinforced resin molded body precursor W, which has softened in the transfer process from the heating furnace 1 to the molding die 2, can be maintained in the desired state, the supply of current in the transfer process is not necessarily needed.

When the fiber-reinforced resin molded body precursor W held by the pair of holding tools 5 is transferred to the molding die 2, the upper die 2A and the lower die 2B that form the molding die 2 are opened as illustrated in FIG. 4A, and the fiber-reinforced resin molded body precursor W is moved to a gap therebetween.

Next, as illustrated in FIG. 4B, holding of the fiber-reinforced resin molded body precursor W by the holding tools 5 is released, and the upper die 2A and the lower die 2B are closed as illustrated in FIG. 4C so as to perform press molding (press P).

After the press molding, the upper die 2A and the lower die 2B are opened and the molded fiber-reinforced resin molded body W' is removed from the molding die 2, whereby the fiber-reinforced resin molded body W' is produced (hereinabove is the second step).

According to the method for producing the fiber-reinforced resin molded body illustrated in the drawing, the inside and the surface of the fiber-reinforced resin molded body precursor W can be heated concurrently in the first step. Therefore, temperature unevenness between the inside and the surface of the fiber-reinforced resin molded body precursor W can be reduced as much as possible, and the heating time for the fiber-reinforced resin molded body precursor W can be shortened as much as possible, which in turn can significantly reduce the production time. Therefore, problems as seen in the conventional production method cannot occur, such that it takes a long time to sufficiently heat the inside of the fiber-reinforced resin molded body precursor, in which case the surface of the fiber-reinforced resin molded body precursor, which has been sufficiently heated, is heated too much, which makes it difficult to maintain the desired softened state.

Further, in the second step, supply of current to the softened fiber-reinforced resin molded body precursor W is continued even in the transfer process from the heating furnace 1 to the molding die 2, so that a temperature decrease of the fiber-reinforced resin molded body precursor W in the transfer process can be suppressed, and the fiber-reinforced resin molded body precursor W in the desired softened state can be moved to the molding die 2 so as to proceed to a molding step.

Although the embodiments of the present disclosure have been described in detail with reference to the drawings, specific configurations are not limited thereto, and any design changes and the like that are within the spirit and scope of the present disclosure are all included in the present disclosure.

DESCRIPTION OF SYMBOLS

1 Heating furnace
1a Front door
1b Rear door
1c Groove

1*d* Heating apparatus
2 Molding die
2A Upper die
2B Lower die
3 Suspension rail
4*a* Roller
4*b* Frame
5 Holding tool (holding tool that also functions as an electrode)
6*a* Circuit
6*b* Power supply
W Fiber-reinforced resin molded body precursor
W' Fiber-reinforced resin molded body
Wa Matrix resin
Wb Fibrous materials

What is claimed is:

1. A method for producing a fiber-reinforced resin molded body, comprising:
   a first step of storing a fiber-reinforced resin molded body precursor containing thermoplastic resin as matrix resin and also containing a conductive fibrous material in the matrix resin into a heating furnace with heating apparatuses while holding the fiber-reinforced resin molded body precursor at opposite sides thereof using a pair of holding tools that also function as electrodes, and actuating the heating apparatuses while supplying current to the fiber-reinforced resin molded body precursor from the electrodes, thereby softening the fiber-reinforced resin molded body precursor; and
   a second step of transferring the softened fiber-reinforced resin molded body precursor to a molding die using the holding tools, and molding a fiber-reinforced resin molded body in the molding die.

2. The method for producing a fiber-reinforced resin molded body according to claim 1,
   wherein:
   the heating apparatuses are located at least in an upper position and a lower position in the heating furnace, and
   in the first step, the fiber-reinforced resin molded body precursor is placed between the upper and lower heating apparatuses and is heated.

3. The method for producing a fiber-reinforced resin molded body according to claim 2,
   wherein:
   the fiber-reinforced resin molded body precursor has a flat sheet shape or a flat plate shape,
   the upper and lower heating apparatuses are arranged in parallel with each other in the heating furnace, and
   in the first step, the fiber-reinforced resin molded body precursor is placed in parallel with the upper and lower heating apparatuses and is heated.

4. The method for producing a fiber-reinforced resin molded body according to claim 1,
   wherein:
   in the second step, supply of current to the fiber-reinforced resin molded body precursor from the electrodes is continued even while the fiber-reinforced resin molded body precursor is transferred to the molding die using the holding tools.

5. The method for producing a fiber-reinforced resin molded body according to claim 4,
   wherein:
   the heating apparatuses are located at least in an upper position and a lower position in the heating furnace, and
   in the first step, the fiber-reinforced resin molded body precursor is placed between the upper and lower heating apparatuses and is heated.

6. The method for producing a fiber-reinforced resin molded body according to claim 5,
   wherein:
   the fiber-reinforced resin molded body precursor has a flat sheet shape or a flat plate shape,
   the upper and lower heating apparatuses are arranged in parallel with each other in the heating furnace, and
   in the first step, the fiber-reinforced resin molded body precursor is placed in parallel with the upper and lower heating apparatuses and is heated.

7. The method for producing a fiber-reinforced resin molded body according to claim 1, wherein the pair of holding tools are L-shaped holding tools that hold the fiber-reinforced resin molded body precursor at left and right sides thereof.

8. The method for producing a fiber-reinforced resin molded body according to claim 1, wherein in the first step, the pair of holding tools pass through grooves in a ceiling of the heating furnace.

* * * * *